Nov. 9, 1965

G. U. OPPEL 3,216,312

DIFFERENTIAL PHOTOELASTIC STRAIN GAGE

Filed April 28, 1961

INVENTOR.
George U. Oppel

Nov. 9, 1965  G. U. OPPEL  3,216,312
DIFFERENTIAL PHOTOELASTIC STRAIN GAGE
Filed April 28, 1961  2 Sheets-Sheet 2
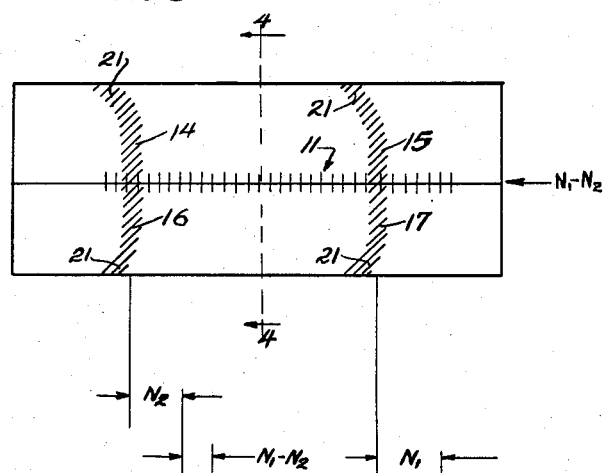
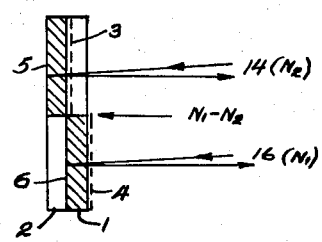
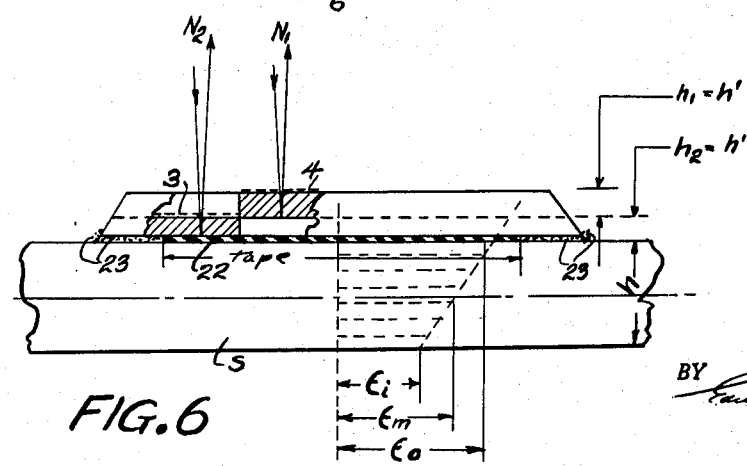
INVENTOR.
George U. Oppel

3,216,312
DIFFERENTIAL PHOTOELASTIC STRAIN GAGE
George U. Oppel, 1954 Park Forest Ave., Park Forest
Village, State College, Pa.
Filed Apr. 28, 1961, Ser. No. 106,215
2 Claims. (Cl. 88—14)

This invention relates to a differential photoelastic strain gage.

An object of my invention is to measure separately tension and bending strains that occur in structures such, for example, as diaphragms, although not necessarily limited thereto, and to measure these strains from one side of a diaphragm or structure.

Other objects and advantages will be more apparent to those skilled in the art from the following description of the drawings in which:

FIG. 3 is an elevational view of the lengthwise edge of my photoelastic differential strain gage showing interference lines that are visible in the unstrained gage;

FIG. 4 is a transverse section taken on line 4—4 of FIG. 3;

FIG. 5 is a view similar to FIG. 3 but showing the interference lines in a strained gage, and FIG. 6 is a side elevation of the gage fixed to a specimen with parts broken away along a line 6—6 of FIG. 6 to show the origin of typical fringe lines.

Figure 1:
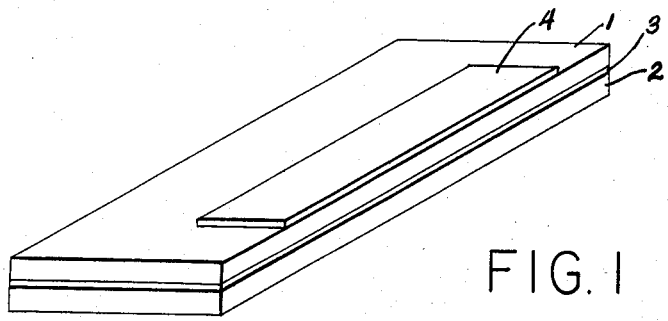
FIG. 1 is a perspective view of my photoelastic differential strain gage.

My improved photoelastic differential strain gage includes two gage plates 1 and 2 which have "frozen-in" stresses which are well-known in the art. Hence details of the method of constructing such plates are not repeated here. If these gage plates are observed in polarized light, a set of parallel interference lines caused by the frozen stresses in the plates becomes visible, these lines traversing the plates from edge to edge. These plates are deposed in superimposed relation to each other such that the interference lines are mutually parallel. Between the two gage plates 1 and 2 is a polarizing sheet of film 3 and on top of the gage plate 1 another polarizing sheet 4 partially covering the gage. Parts 1 to 4 form a solid unit preferably by cementing all of them together with suitable cements such, for example, as acrylic and epoxy cements, although it will be understood that only the intermediate polarized sheet need be cemented to the two plates 1 and 2. In this case the upper polarizing sheet need not be fixed to the upper plate. However, it is desirable that all of them be cemented together for ease of handling. An example of acrylic cement is the modified cyanoacrylate No. 910 made by Eastman Chemical Products, Inc. Strains to be measured are transmitted into the gage by bonding plate 2 to a test specimen surface, using a suitable cement such as previously described. Gage plate 2 is silvered at its rear face as indicated by the dotted line area 5, FIG. 2. The other gage plate 1 is only partially silvered opposite to the location of the polarized sheet 4, as indicated by dotted-line area 6. The gage plate 1 is, therefore, partially transparent.

Figure 2:
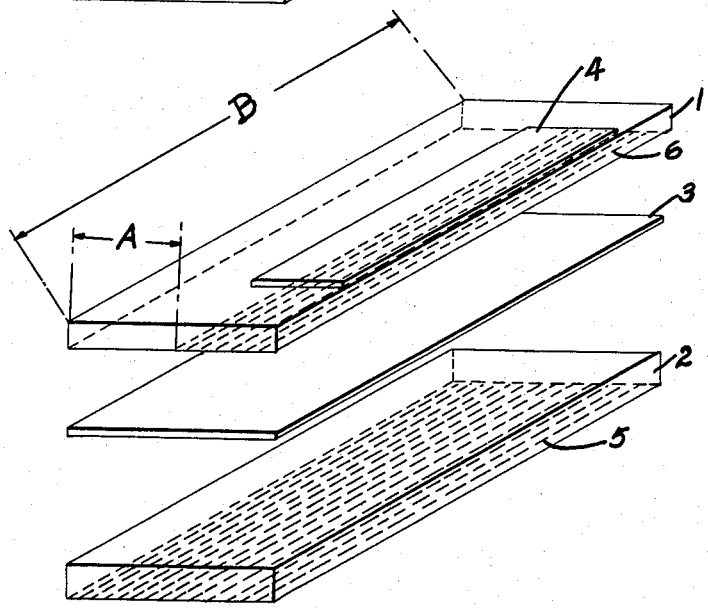
FIG. 2 is an "exploded" diagrammatic view of the different components prior to being cemented together to form the gage as shown in FIG. 1.

Now, if the gage is bonded to the surface of a metal sheet, for instance, in which bending occurs, then the bending strains are transmitted into this device and since plate 2 is closer to the surface of the specimen being subjected to bending, this plate undergoes less straining than plate 1 which is further from the surface of the test speciment. While I have previously referred to the plates 1 and 2 as being bonded to the polarizer sheet 3, it will of course be understood that this is for the purpose of providing a convenient method of manufacturing. However, such arrangement broadly encompasses the essential fact that only the plates need be subjected to specimen strains which means that the intermediate polarizing sheet can be handled. To accomplish this, the plates need be only slightly larger than the intermediate polarizer sheet so that such plates can be secured together sufficiently to transmit the necessary strain. Photoelastically the following occurs: the displacement of fringe lines in each photoelastic plate is a direct function of the strain at the neutral axis of the respective plate. Since, as shown above, a specimen in bending will produce a higher strain in plate 1 than plate 2, then the frozen stress interference lines of plate 1 will displace more than those of plate 2. Readings taken from said interference lines can then be used to determine directly the bending strain and the tensile or compressive strain in the specimen. The strain of plate 2 as indicated by a displacement of interference lines can be read by looking through part A–B of plate 1 of the composite gage. As has been mentioned, the gage plate 1 has only been partially silvered at its rear face as can be seen in FIG. 2, the dotted lines indicating the nontransparent area 6. In FIG. 3 the displacement of interference lines 14 and 15 relative to interference lines 16 and 17 (later referred to as $N_1-N_2$), can be measured on a graduated scale 11 laid over the top plate 1 along the inner lengthwise edge of polarizing sheet 4. The inner edge of the mirrored surface 6 denes a line of demarcation with the lower plate whereby such line of demarcation cuts the frozen-in interference lines at points between their ends such that at said line the interference lines are straight and true and said line of demarcation runs substantially perpendicular to the interference lines when the gage is in an unstrained state. The inner edge of the polarizing sheet 4 substantially coincides with the line of demarcation created by the inner edge of the area 6. Interference lines 14 and 15 originate in the lower gage plate 2 and the other interference lines 16 and 17 originate in the upper gage plate 1 as shown in FIGS. 3 and 4. Since in bending of the specimen the upper gage plate 1 is strained to a greater degree than the lower gage plate 2, the displacement of the interference lines 16 and 17 ($N_1$) is larger than the displacement of the interference lines 14 and 15 ($N_2$). It can be easily understood that the bending strains in the specimen which cause this difference in displacement of the fringe lines can be calculated by taking into account the distance of gage plate 1 as well as the distance of gage plate 2 from the surface of the specimen subjected to bending. In the case, however, where the specimen is subjected to pure tension or compression, it can also be easily understood that the displacement of the four fringe or interference lines, 14 and 15 in the lower plate and 16 and 17 in the upper plate, is the same. If the specimen's total surface strain is denoted by $\epsilon_0$, then this strain can be calculated by using the formula:

$$\epsilon_0 = \frac{N_1+N_2}{2} - (N_1-N_2)$$

substituting the amounts $N_1$, $N_2$ and $N_1-N_2$ of the interference line displacements read from gage scale 11. The total strain $\epsilon_i$ at the specimen face opposite to the gage is given by the formula:

$$\epsilon_i = \frac{N_1+N_2}{2} - (N_1-N_2)\left(1+\frac{h}{h'}\right)$$

where $h$ is the specimen thickness.
$h'$ is one-half the composite gage thickness.

The tensile or compressive strain $\epsilon_m$ at the specimen surface on which the gage is applied is:

$$\epsilon_m = \frac{1}{2}\left[(N_1+N_2)-(N_1-N_2)\frac{(2h' \times h)}{h'}\right]$$

and the bending strain $\epsilon_b$ on the same surface is $$\epsilon_b = \frac{\overline{(N_1-N_2)}}{2}\frac{h}{h'}$$

As already explained, the interference lines 14 and 15 originate in the lower gage plate 2 and the interference lines 16 and 17 originate in the upper gage plate 1. When this differential gage is subjected to strain, then the interference lines 14 and 15 are displaced for the same amount since the active part of plate 1 is assumed to be in a field of uniform straining. In general, the interference lines 16 and 17 are displaced for an amount different from the displacement of the lines 14 and 15. However, both lines 16 and 17 again undergo a displacement equal to each other. As far as the polarizing layer 3, FIG. 2, is concerned it is necessary only that this film covers the gage plate 2 partially in the region described by AB, FIG. 1. This procedure saves polarizing material. Such an arrangement is shown in FIG. 4. The polarizing sheet 3 covers the active part of the lower gage plate 2 only.

It is a feature of this differential gage that both gage plates have frozen stress interference lines when viewed through polarizers, and said interference lines traverse completely across each gage block even though only a portion of each interference line is visible in an assembled differential gage. Gage plates having such frozen stress interference lines are referred to herein as being "optically inhomogeneous." Further, that in an assembled differential gage for each gage plate the visible end of each interference line nearest the line of demarcation of the gage is not the end of the interference line in that plate, the remainder being hidden from view by a lack of polarization in the case of gage plate 1 and by light being blocked by gage plate 1 in the case of gage plate 2. The light may come from any suitable source such as daylight or an artificial source. In the important reading area at the line of demarcation of the gage where $N_1-N_2$, and $N_1$ and $N_2$ separately may all be read, the interference lines are absolutely straight and clear, it being impossible for the well-known photoelastic disturbance "time edge effects" (e.g. 21) to attack the central portion of an interference line. ("Time edge effects" result from moisture and environmental changes both of which attack the interference line around its edge.) Fabrication of this differential gage is also less critical since heating of the gage plate edge during cutting can affect only the interference line ends, with the central area remaining straight and true.

It is a further feature of this differential gage that, if it is of rectangular shape as shown in the drawings and with the line of demarcation running down the center, when the longitudinal axis of the gage is not aligned with a principal strain direction in the specimen, strains may still be read directly from scale 11 without correction. In my copending application Ser. No. 816,918 filed May 29, 1959, is disclosed a method of preventing lateral sensitivity of a photoelastic strain gage by means of a soft tape 22, preferably elastomeric with pressure-sensitive adhesive on the side next to the gage, placed between the gage and the specimen under the active section of the gage, and extending upward along the gage sides in the active area, only the ends of the gage being firmly cemented at 23 to the specimen S. Employing such a device produces gages which will respond to strain in the direction of the gage axis only. Should said gage be cemented to a specimen with its axis aligned other than in a specimen principal strain direction then the pattern will be skewed upon straining and true strain is obtained by averaging interference line displacements as read from scales located on the outer edges of the gage. It can be easily seen, however, that in the case of the differential photoelastic strain gage herein described, which is rectangular in shape as shown in the drawings, readings of strains $N_1$ and $N_2$ separately as well as $N_1-N_2$ can be obtained directly and without averaging since said strains as indicated on scale 11 are automatically averaged, their values being read from the mid-point of each interference line. The arrangement of gage plates and the single scale on top of the gage makes it possible to compute the bending and tensile or compressive strains by using simple formulae such as those that are given above, regardless of the gage application direction.

It is easily understood that the reflecting surfaces underneath plates 1 and 2 may be provided by a coating on the underneath side of each plate or by the inclusion of any separate reflecting objects located underneath each plate and as shown in FIG. 2 as areas 5 and 6. Area 5 need be only as large as the area A–B.

It is not necessary for reflecting surfaces 5 and 6 for polarizers 3 and 4 to be firmly fixed to the differential gage, only their location is critical. Gage plates 1 and 2 must be rigidly joined such that strains transmitted to the gage from a specimen to which it might be attached will be faithfully transmitted through plate 2 to plate 1.

Thus, it is seen that I have provided an extremely effective differential photoelastic strain gage that is relatively simple in construction and operation.

It will of cource be understood that various changes in details or construction and arrangement of parts may be made by those skilled in the art without departing from the spirit of the invention as set forth in the appended claims.

I claim:
1. A differential strain gage comprising, in combination, two superimposed photoelastic layers of optically inhomogeneous material, each layer containing frozen-in stress interference lines visible when viewed with polarized light, said interference lines being substantially parallel to one another and substantially traversing the entire layer, said layers being aligned so that the interference lines of both layers are substantially parallel to each other, a mirrored surface disposed partially beneath the upper layer so as to obscure a portion of the lower layer but allow the remaining portion to be exposed so as to be seen through the upper layer, a mirrored surface beneath the exposed portion of the lower layer, two polarizing sheets, one being disposed between the two layers so as to overlie the exposed portion of the lower layer, and the other polarizing sheet being disposed over that portion of the upper layer beneath which the mirrored surface of the upper layer is disposed, the mirrored surface beneath the upper layer defining a line of demarcation with the lower layer whereby said demarcation line cuts the frozen-in interference lines at points between their ends such that at said line of demarcation the interference lines are straight and true and said demarcation line runs substantially perpendicular to said interference lines when the gage is in an unstrained state, said inhomogeneous layers being connected together so as to transmit strain to both layers from a specimen to which the gage would be attached, whereby when the gage is subjected to bending strains substantially in the direction of said line of demarcation the interference lines of the upper and lower layers move different amounts in the same direction.

2. A gage, as claimed in claim 1, in which the layers are rectangular in shape, and a single scale is placed along the line of demarcation on the upper surface of the upper layer.

References Cited by the Examiner

UNITED STATES PATENTS

| | | | |
|---|---|---|---|
| 2,096,964 | 10/37 | Frocht | 88—14 |
| 2,460,515 | 2/49 | Lowber et al. | 88—65 |
| 2,625,850 | 1/53 | Stanton | 88—65 X |

JEWELL H. PEDERSEN, *Primary Examiner.*

EMIL G. ANDERSON, *Examiner.*